US012091045B2

(12) United States Patent
Schneemann

(10) Patent No.: US 12,091,045 B2
(45) Date of Patent: Sep. 17, 2024

(54) METHOD AND SYSTEM FOR ASSESSING WHETHER A VEHICLE IS LIKELY TO LEAVE AN OFF-ROAD PARKING AREA

(71) Applicant: FORD GLOBAL TECHNOLOGIES, LLC, Dearborn, MI (US)

(72) Inventor: Friederike Schneemann, Munich (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 264 days.

(21) Appl. No.: 17/654,615

(22) Filed: Mar. 14, 2022

(65) Prior Publication Data

US 2023/0303117 A1 Sep. 28, 2023

(51) Int. Cl.
*B60W 60/00* (2020.01)
*B60W 40/04* (2006.01)
*B60W 50/00* (2006.01)

(52) U.S. Cl.
CPC ........ *B60W 60/0011* (2020.02); *B60W 40/04* (2013.01); *B60W 50/0097* (2013.01); *B60W 60/00274* (2020.02); *B60W 2552/53* (2020.02); *B60W 2554/4041* (2020.02); *B60W 2554/4045* (2020.02)

(58) Field of Classification Search
CPC .. B60W 30/0956; B60W 40/04; B60W 40/06; B60W 50/0097; B60W 60/001; B60W 60/0011; B60W 60/0027; B60W 60/00274; B60W 2552/53; B60W 2554/20; B60W 2554/4029; B60W 2554/4041; B60W 2554/4044; B60W 2554/4045; B60W 2554/4046

See application file for complete search history.

(56) References Cited

U.S. PATENT DOCUMENTS

| | | | |
|---|---|---|---|
| 9,428,196 B2 | 8/2016 | Ono | |
| 11,131,993 B2 | 9/2021 | Singh et al. | |
| 11,167,754 B2 | 11/2021 | Costa et al. | |
| 11,169,531 B2 | 11/2021 | Hong et al. | |
| 2013/0238194 A1* | 9/2013 | Ueda | B62D 15/025 701/41 |
| 2019/0317511 A1 | 10/2019 | Xu et al. | |
| 2020/0110416 A1* | 4/2020 | Hong | G05D 1/0221 |
| 2021/0107476 A1 | 4/2021 | Cui | |

(Continued)

OTHER PUBLICATIONS

Shen, X. et al., ParkPreduct: Motion and Intent Prediction of Vehicles in Parking Lots, arXiv:2004.10293v1 [cs.RO] Apr. 21, 2020.

(Continued)

*Primary Examiner* — Peter D Nolan
*Assistant Examiner* — Ce Li Li
(74) *Attorney, Agent, or Firm* — Frank A. MacKenzie; Brooks Kushman, P.C.

(57) ABSTRACT

This document discloses system, method, and computer program product embodiments for assessing whether a vehicle that is positioned in an off-road parking area is exhibiting intent to enter the road. If the vehicle exhibits such intent, the system may forecast a trajectory for the vehicle. If the vehicle does not exhibit such intent, a trajectory forecast may not necessarily be required. The trajectory forecasts for vehicles that do exhibit such intent may then be used by an autonomous vehicle in motion planning operations.

20 Claims, 10 Drawing Sheets

(56) References Cited

U.S. PATENT DOCUMENTS

| | | | |
|---|---|---|---|
| 2021/0122363 A1* | 4/2021 | Mielenz | G08G 1/168 |
| 2021/0269065 A1* | 9/2021 | Haggblade | B60W 30/18154 |
| 2021/0295171 A1 | 9/2021 | Kamenev et al. | |
| 2021/0309216 A1* | 10/2021 | Pantano-De-Luca | B60W 30/0956 |
| 2022/0266873 A1 | 8/2022 | Savtchenko et al. | |

OTHER PUBLICATIONS

Darms, M. et al., Classification and Tracking of Dynamic Objects with Multiple Sensors for Autonomous Driving in Urban Environments.

International Search Report and Written Opinion in corresponding International Application No. PCT/US2023/063315 dated Jun. 15, 2023, 7 pages.

* cited by examiner

METHOD AND SYSTEM FOR ASSESSING WHETHER A VEHICLE IS LIKELY TO LEAVE AN OFF-ROAD PARKING AREA

BACKGROUND

Many modern vehicles have on-board sensors that detect objects that are near the vehicles. For detected objects that may move (in other words, actors in the vehicle's environment), the sensors provide data about the detected actors to a forecasting system. The forecasting system makes predictions about what actions the actor may take, including possible trajectories. These predictions are especially useful for autonomous vehicles (AVs), which may use the predicted trajectories to plan motion of the AV.

When a vehicle traveling along a road detects another actor that is also moving on the same road or on an intersecting road, the vehicle's forecasting system typically will predict a trajectory for that actor. In urban and certain other environments, the vehicle also may detect vehicles that are parked along the road. In such situations, the AV must be able to differentiate vehicles that are likely to enter the AV's path from those that will remain off the road, whether those vehicles are moving or parked. For any vehicle that is likely to enter the AV's path, the system will forecast the vehicle's trajectory and consider that forecast when planning the AV's motion. In addition, while the forecasting system could forecast trajectories for all of the parked vehicles that the sensors detect, doing so would be computationally intensive. Therefore, it is desirable to reduce the number of parked vehicles for which trajectory forecasts are required, so that trajectory forecasts only need to be generated for those parked vehicles that are most likely to leave the parking area and enter the road, and so that the AV's motion planning operations can prioritize forecasts for the off-road actors that are most likely to enter the road.

This document describes methods and systems that are directed to addressing the problems described above, and/or other issues.

SUMMARY

This document describes method, system and computer program embodiments of a process that forecasts a trajectory of a vehicle that is positioned in an off-road parking area. In the process, a first vehicle that is on a road will detect that a second vehicle is at least partially positioned in an off-road parking location that is proximate to the road. A system that is associated with the first vehicle will assess whether the second vehicle exhibits intent to leave the off-road parking location and enter the road by: (i) forecasting a plurality of candidate goal locations for the second vehicle; (ii) filtering the plurality of candidate goal locations to yield a subset of likely goal locations; and (iii) in response to at least one of the candidate goal locations intersecting with a lane of the road, determining that the second vehicle exhibits intent to leave the off-road parking location. The system may be on-board the first vehicle, or in a remote computing device that is communicatively connected to a network via which it may receive the perception data from the first vehicle.

In some embodiments, the system may use the subset of likely goal locations to forecast a trajectory of the second vehicle. A system that is associated with the first vehicle will then use the trajectory to plan an action of the first vehicle that is responsive to the forecasted trajectory of the second vehicle.

In any of the embodiments above, detecting that the second vehicle is at least partially positioned in the off-road parking location may include measuring an area of overlap between a polygon representing a position of the second vehicle and a polygon associated with one or more lanes of the road that are proximate to the second vehicle. The system may then detect that the second vehicle is at least partially positioned in the off-road parking location in response to the area of overlap being less than a threshold occupancy level.

In any of the embodiments above, to assess whether the second vehicle exhibits intent to leave the off-road parking location and enter the road, the system may first identify a motion action of the second vehicle. To do this, the first vehicle may detect that the second vehicle is taking or took the motion action (i.e., that the second vehicle is moving or recently moved). Alternatively or in addition, to detect the motion action, the system may use a classifier to classify the second vehicle as not parked. In such situations, determining that the second vehicle exhibits intent to leave the off-road parking location also may be in response to identifying the motion action.

In any of the embodiments above, forecasting the plurality of candidate goal locations for the second vehicle may include generating an object ray that represents a candidate path of travel for the second vehicle away from the off-road parking location. For example, the object ray may start at the off-road parking location and be oriented in a direction of a heading or a velocity of the second vehicle. The system may then use a plurality of intersections, each of which is a location at which the object ray is in a lane of the road, to select the plurality of candidate goal locations. Optionally, using the plurality of intersections to select the plurality of candidate goal locations may include, for each lane in which the object ray is in the lane: (a) identifying any intersection at which the object ray meets a centerline of the lane; and (b) using either the intersection or a specified distance from the intersection in a direction of travel the lane as the candidate goal location.

In some situations using the embodiments in which object rays are generated, for any lane that splits into first and second successor lanes between the intersection and the specified distance from the intersection, selecting the plurality of candidate goal locations may further include, for that lane: (a) identifying a first candidate position along a first centerline of the first successor lane, wherein the first candidate position is a specified distance from the intersection along the first centerline in the direction of travel; and (b) identifying a second candidate position along a second centerline of the second successor lane. The second candidate position will be a specified distance from the intersection along the second centerline the direction of travel of the lane. The system will then use the first candidate position and the second candidate position as candidate goal locations.

In other situations using the embodiments in which object rays are generated, generating each object ray may include, in response to determining that the off-road parking location is a parallel parking location: (a) generating a reference ray that starts at the off-road parking location and is oriented in a direction of a heading or a velocity of the second vehicle; (b) generating a first object ray that is oriented in a direction that is rotated to the left of the reference ray; and (c) generating a second object ray that is oriented in a direction that is rotated to the right of the reference ray. Then, when using the plurality of intersections to select the plurality of candidate goal locations, the system may use an intersection of the first object ray, the second object ray, or both with one or more lanes of the road.

In any of the embodiments above, filtering the candidate goal locations to yield a subset of likely goal locations may involve excluding one or more of the candidate goal locations having a position and a heading that are substantially similar to a position and a heading of at least one other of the candidate goal locations filtering the candidate goal locations. In addition or alternatively, filtering the candidate goal locations to yield a subset of likely goal locations may involve excluding any of the candidate goal locations that are not physically reachable by the second vehicle.

BRIEF DESCRIPTION OF THE DRAWINGS

The accompanying drawings are incorporated into this document and form a part of the specification.

In the drawings, like reference numbers generally indicate identical or similar elements. Additionally, generally, the left-most digit(s) of a reference number identifies the drawing in which the reference number first appears.

DETAILED DESCRIPTION

This document describes system, apparatus, device, method and/or computer program product embodiments, and/or combinations and sub-combinations of any of the above, for assessing whether a vehicle parked in an off-road parking area exhibits intent to enter a road.

As described in the Background section above, many autonomous vehicles (AVs) and other vehicles have sensors that detect other actors in the vehicle's environment. In some areas, such as urban environments, the other actors will include parked vehicles. When an AV or other vehicle detects another actor, it may forecast a trajectory for the other actor. However, trajectory forecasting methods are computationally intensive, and the calculation of trajectories for parked vehicles that are likely to remain so wastes time and processing resources. Therefore, this document describes methods that can help a system identify which parked vehicles are most likely to enter the road, thus improving trajectory forecasting and motion planning operations, and also allowing trajectory forecasting resources to be focused on those off-road vehicles that are most likely to enter the road.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

Definitions for additional terms that are relevant to this document are included at the end of this Detailed Description.

Notably, this document describes the present solution in the context of an AV. However, the present solution is not limited to AV applications. The present solution may be used in other applications such as robotic applications, radar system applications, metric applications, and/or system performance applications.

Figure 1:
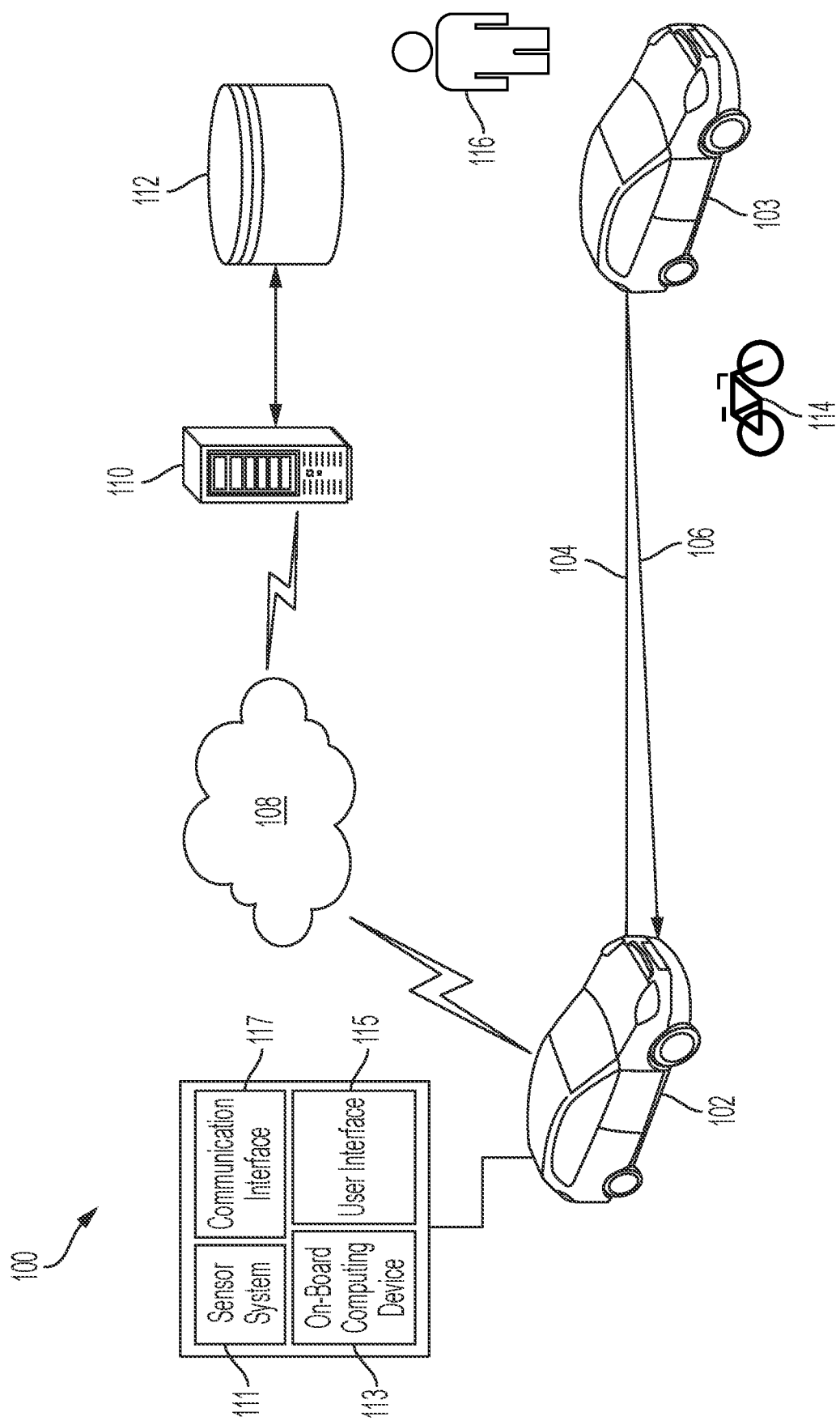
FIG. 1 illustrates an example system by which a vehicle may detect other actors in its environment, in accordance with aspects of the disclosure.

FIG. 1 illustrates an example system 100, in accordance with aspects of the disclosure. System 100 comprises a vehicle 102 that is traveling along a road in a semi-autonomous or autonomous manner. Vehicle 102 is also referred to in this document as AV 102. AV 102 can include, but is not limited to, a land vehicle (as shown in FIG. 1), an aircraft, or a watercraft. As noted above, except where specifically noted this disclosure is not necessarily limited to AV embodiments, and it may include non-autonomous vehicles in some embodiments.

AV 102 is generally configured to detect objects in its proximity. The objects can include other actors in the AV's environment, such as a vehicle 103, cyclist 114 (such as a rider of a bicycle, electric scooter, motorcycle, or the like) and/or a pedestrian 116.

As illustrated in FIG. 1, the AV 102 may include a sensor system 111, an on-board computing device 113, a communications interface 117, and a user interface 115. Autonomous vehicle system 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the AV 102. For example, such sensors may include, without limitation, a lidar system, a light detection and ranging (LIDAR) system, a radio detection and ranging (RADAR) system, a laser detection and ranging (LADAR) system, a sound navigation and ranging (SONAR) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 102, information about the environment itself, information about the motion of the AV 102, information about a route of the vehicle, or the like. As AV 102 travels over a surface, at least some of the sensors may collect data pertaining to the surface.

The AV 102 may also communicate sensor data collected by the sensor system to a remote computing device 110 (for example, a cloud processing system) over communications network 108. Remote computing device 110 may be configured with one or more servers to process one or more processes of the technology described in this document. Remote computing device 110 may also be configured to communicate data/instructions to/from AV 102 over network 108, to/from server(s) and/or database(s) 112.

As noted above, the sensor system 111 of the AV 102 may include one or more cameras that capture images of objects in the AV's environment. The sensor system 111 also may include a LIDAR system, such as LIDAR system 866 of FIG. 8. The lidar system may be configured to transmit a light pulse 104 to detect objects located within a distance or range of distances of AV 102. Light pulse 104 may be incident on one or more objects (such as vehicle 103) and be reflected back to the lidar system. Reflected light pulse 106 incident on the lidar system may be processed to determine a distance of that object to AV 102. The reflected light pulse may be detected using, in some embodiments, a photodetector or array of photodetectors positioned and configured to receive the light reflected back into the lidar system. Lidar information, such as detected object data, is communicated from the lidar system to an on-board computing device 113. The AV 102 may also communicate lidar data to the remote computing device 110 over communications network 108.

It should be noted that the lidar systems for collecting data pertaining to the surface may be included in systems other than the AV 102 such as, without limitation, other vehicles (autonomous or driven), robots, satellites, etc.

Network 108 may include one or more wired or wireless networks. For example, the network 108 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 102 may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102 and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102 including, for example, a keyboard, a touch screen display device, a microphone, and a speaker, etc. The vehicle also may receive state information, descriptive information or other information about devices or objects in its environment via the communication interface 117 over communication links such as those known as vehicle-to-vehicle, vehicle-to-object or other V2X communication links. The term "V2X" refers to a communication between a vehicle and any object that the vehicle may encounter or affect in its environment.

Figure 2:
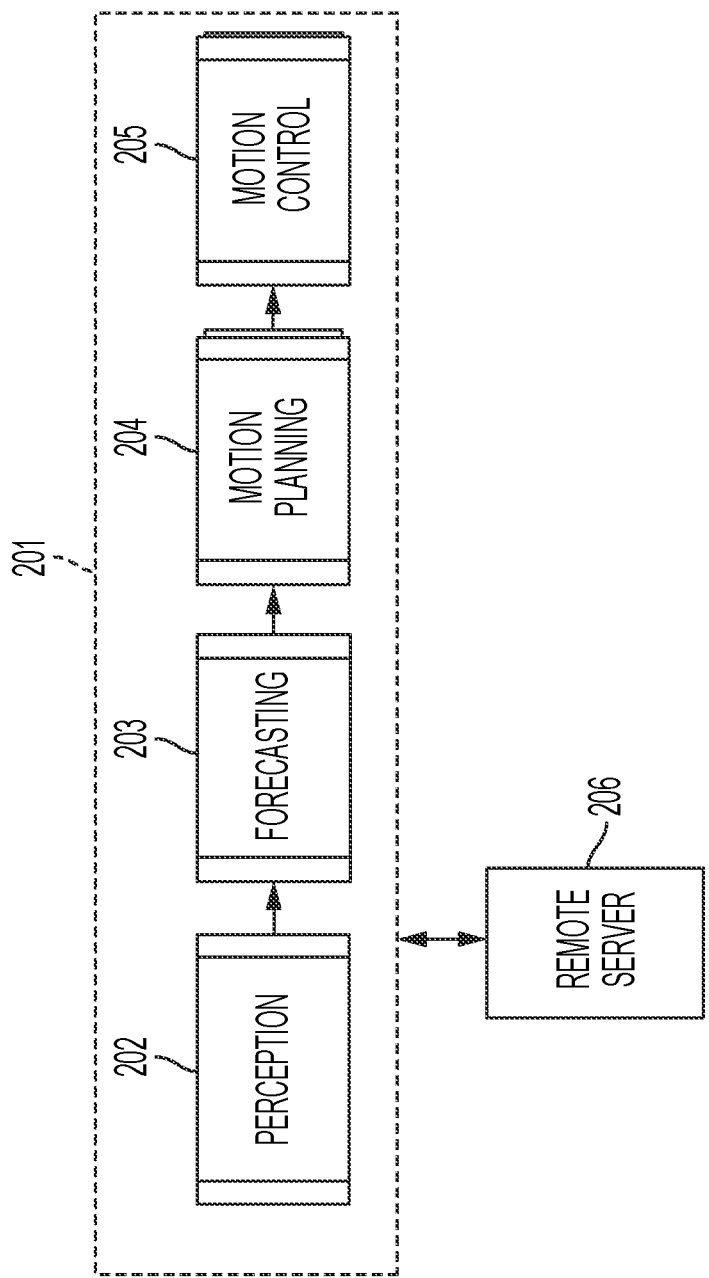
FIG. 2 is a block diagram that illustrates various subsystems of an autonomous vehicle.

FIG. 2 shows a high-level overview of vehicle subsystems that may be relevant to the discussion above. Certain components of the subsystems may be embodied in processor hardware and computer-readable programming instructions that are part of the vehicle on-board computing system 201.

The subsystems may include a perception system 202 that includes sensors that capture information about moving actors and other objects that exist in the vehicle's immediate surroundings. Example sensors include cameras, LIDAR sensors and radar sensors. The data captured by such sensors (such as digital image, LIDAR point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 202 may deliver perception data to the vehicle's forecasting system 203. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 204 and motion control system 205 so that the receiving systems may assess such data and initiate any number of reactive motions to such data. The motion planning system 604 and control system 605 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 204 may be embodied in processor hardware and computer-readable hardware that are part of an electronic devices that is contained with the vehicle, such as a dashboard navigation system or a mobile electronic device of the operator. In such situations, the electronic device may output the trajectories planned by the motion planning system via a display, an audio speaker, or both. In addition, some parts of the perception system 202 may include a transceiver of an electronic device that receives certain perception data (such as weather data) from a remote server via wireless communication.

The vehicle's on-board computing system 201 may be in communication with a remote server 206. The remote server 206 is an external electronic device that is in communication with the vehicle's on-board computing system 201, either via a wireless connection while the vehicle is making a run, or via a wired or wireless connection while the vehicle is parked at a docking facility or service facility. The remote server 206 may receive data that the vehicle collected during its run, such as perception data and operational data. The remote server 206 also may transfer data or other information to the vehicle such as software updates, high definition (HD) map updates, machine learning model updates and other information.

Figure 3A:
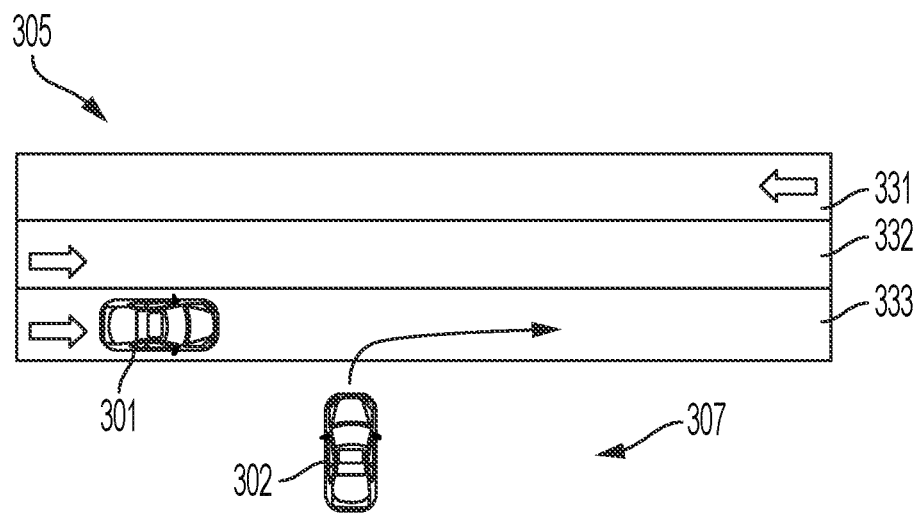
FIGS. 3A-3D illustrate examples of how a vehicle traveling along a road may encounter vehicles parked in off-road parking locations.
Figure 3B:
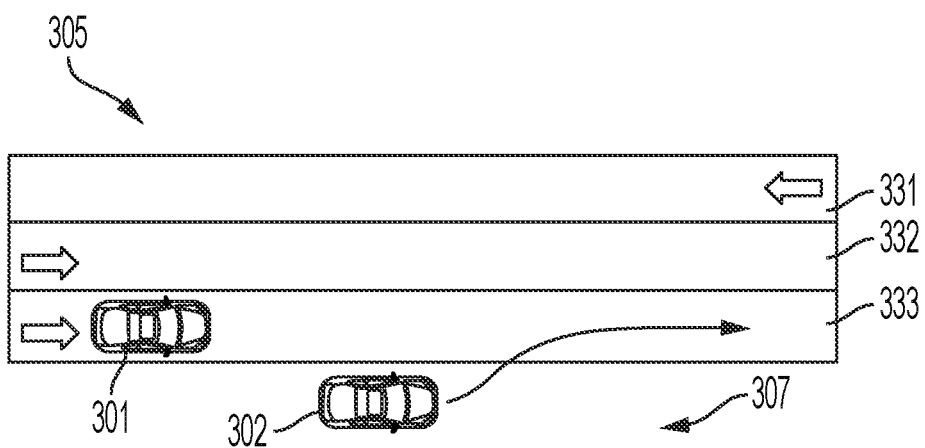

FIGS. 3A and 3B illustrate two examples in which a first vehicle 301 traveling along a road 305 encounters a second vehicle 302 in a parking area 307a, 307b that is near the road 305. The road 305 contains several lanes 331, 332, 333. The parking area 307a, 307b in each case is not in any of those lanes and therefore is an off-road parking area. In FIG. 3A, the second vehicle 302 is positioned in a heading, and approaching the road 305 in a direction, in each case that is perpendicular to the direction of travel of the road's lanes 331, 332, 333. In FIG. 3B, the second vehicle 302 is positioned in a heading, and approaching the road 305 in a direction, in each case that is parallel to the direction of travel of the road's lanes 331, 332, 333, and parking area 307b is therefore a parallel parking area.

Figure 3C:
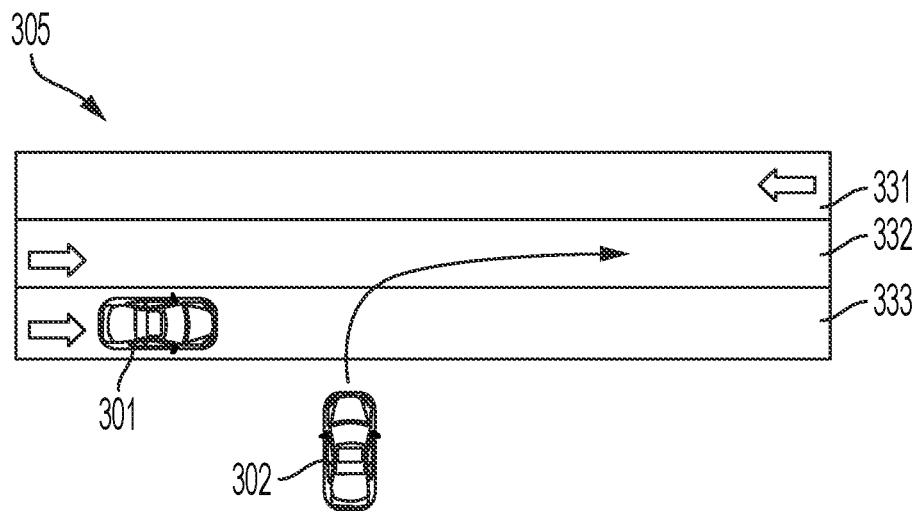
Figure 3D:
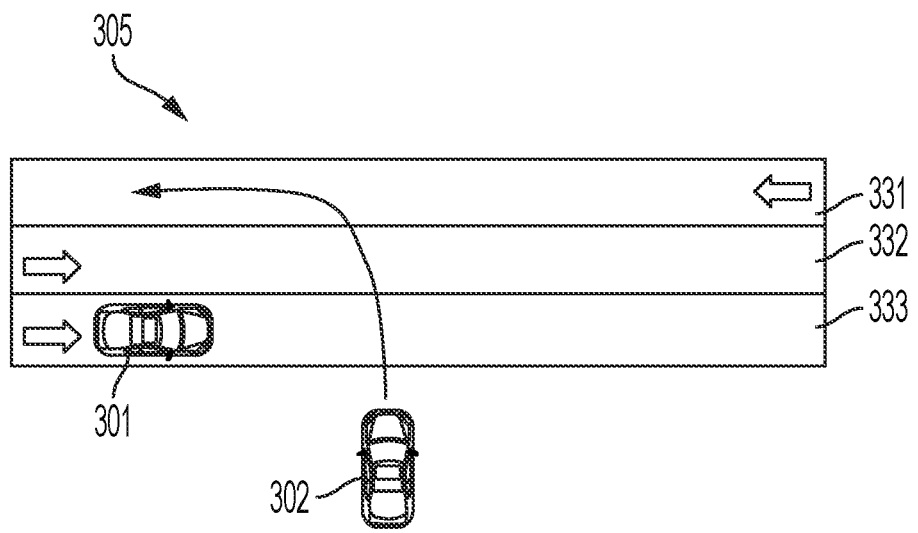

In each of FIGS. 3A and 3B, the first vehicle 301 may detect whether the second vehicle 302 exhibits an intent to enter the road 305 using methods described in this document. The first vehicle also may predict a trajectory of the second vehicle after determining the second vehicle's intent to enter the road. For example, in FIGS. 3A and 3B, the predicted trajectory shows the second vehicle 302 following a trajectory that enters the same lane 333 of the road in which the first vehicle 301 is traveling. However, in FIG. 3C the predicted trajectory of the second vehicle 302 crosses the lane 333 of the first vehicle into adjacent lane 332. In FIG. 3D the predicted trajectory of the second vehicle 302 crosses the lane 333 of the first vehicle as well as adjacent lane 332, all the way to the lane 331 having a direction of travel that is opposite that of lane 333.

Figure 4:
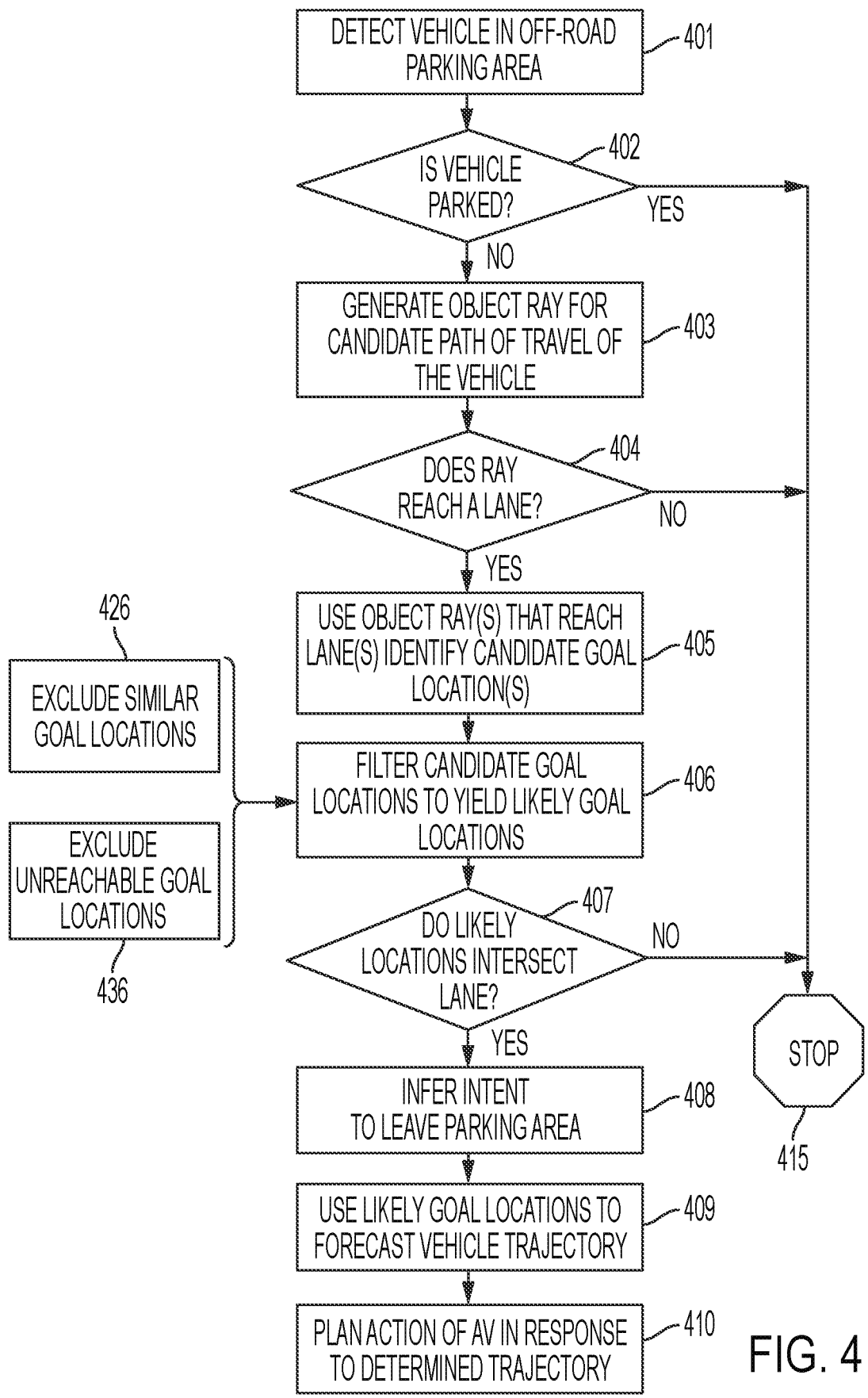
FIG. 4 is a flow diagram illustrating a method by which a system may assess whether or not a vehicle that is parked in an off-road parking location exhibits intent to leave the parking location and enter the road.

FIG. 4 illustrates a process by which a computing system that is associated with a first vehicle may assess whether a second vehicle is about to leave an off-road parking area and enter a road. The computing system may be on-board the first vehicle (such as on-board computing device 113 of FIG. 1), or it may be a separate computing device that is in communication with the first vehicle (such as remote computing system 110 of FIG. 1).

At 401, while the first vehicle is traveling on a road, a perception system associated the first vehicle will detect that a second vehicle is at least partially positioned in an off-road parking location that is proximate to the road. This may be done using cameras, LIDAR systems, and other sensors using processes described above in the context of FIGS. 1 and 2 to identify a second vehicle in off-road parking locations such as those shown in FIGS. 3A through 3D. The sensors may be on-board the first vehicle, or they may be part of a separate system (such as a transportation infrastructure system) that is associated with the first vehicle in that it can communicate with the first vehicle, either directly or indirectly via one or more communication networks or remote control agents.

Figure 5:
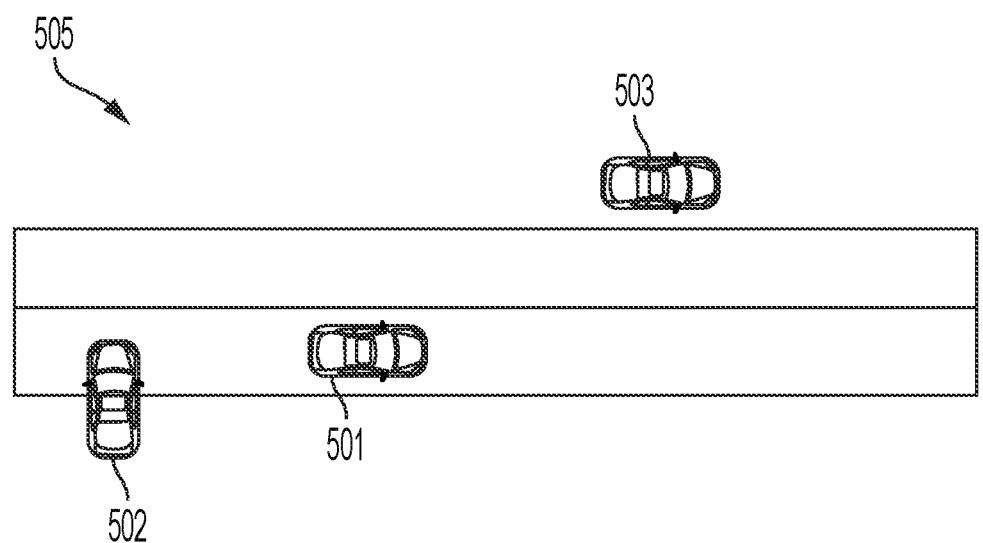
FIG. 5 illustrates an element of how system may assess whether a vehicle is in an off-road parking area.

Optionally, to determine that the second vehicle is in the off-road parking location at 401 and not actually in the road, the system may confirm that no more than a threshold amount of the vehicle's footprint occupies (i.e., overlaps with) the road (or, alternatively, at least a threshold amount of the vehicle's footprint is outside of the road). The footprint of a vehicle may be represented by a bounding box or other polygon that covers the vehicle in a map that includes the road. The system may measure an area of overlap between the second vehicle's polygon and a polygon associated with one or more lanes of the road. The system may determine that the second vehicle is at least partially positioned in the off-road parking location if the area of overlap is (i.e., in response to the area of overlap being) less than a threshold maximum occupancy level, such as 50%, 75%, 85%, or another maximum value. If the area of overlap is greater than the threshold, then the system may determine that the vehicle is actually in the road and not on the off-road parking area. This is illustrated by way of example in FIG. 5, in which vehicle 501 is fully within the road 505, and the area of overlap of the footprint of vehicle 501 with the road 505 is 100%. Vehicle 502 is partially within the road 505, and the area of overlap of the footprint of vehicle 502 with the road 505 is approximately 50%. Vehicle 503 is fully outside of the road 505, so the area of overlap of the footprint of vehicle 503 with the road 505 is 0%. Alternatively and equivalently, the system may measure an area of overlap between the second vehicle's polygon and a polygon associated with the off-road parking area, and the system may determine that the vehicle is in the off-road parking location if the area of overlap is at least a minimum threshold amount.

Returning to FIG. 4, optionally, at 402 as a precondition to proceeding, the system may determine whether the second vehicle is actually parked. If the second vehicle is actually parked (402: YES) the process of this disclosure may stop 415. While the system still may optionally perform further analysis of the second vehicle and predict its trajectory, such steps are not required by this disclosure, and the second vehicle may be excluded from trajectory prediction processes. Either way, for the purpose of this disclosure the system will not determine that the second vehicle is indicating an intent to leave the off-board parking area. However, if the vehicle is not actually parked (402: NO), then the system may continue the process to determine whether the vehicle is exhibiting intent to leave the off-road parking area and enter the road.

To determine whether the vehicle is actually parked (402), the system may use the perception system of the vehicle to detect that the second vehicle is taking or took a motion action. Alternatively, the system may input perception data into a classifier that will classify the second vehicle as either parked or not parked. When a classifier is used, classification as "not parked" will indicate that the vehicle is taking a motion action. For example, using data captured by the first vehicle's camera, LIDAR and/or other on-board or off-board sensors, the system may determine whether the second vehicle's movement exceeds a minimum velocity threshold, such as 0.1 meters per second, either at the present time or within a threshold time range prior to the present time (such as within the past three seconds). As another example, the system may send perception system data to a machine learning-based classifier that assesses whether a likelihood of the vehicle being in the "parked" class is greater than a threshold, and that determines that the vehicle is not parked if the likelihood is less than that threshold. Suitable classifiers include convolutional neural networks (CNNs) and other machine learning models that are trained on labeled datasets of parked vehicles and not parked vehicles.

In response to determining that the vehicle is in an off-road parking area but not parked (402: YES), a forecasting system that is associated with the first vehicle may then assess whether the second vehicle exhibits intent to leave the off-road parking location and enter the road. To do this, the system may forecast multiple candidate goal locations for the second vehicle, filter out candidate goal locations that are not likely, and determine that the second vehicle exhibits intent to leave the off-road parking area if any of the remaining (likely) goal locations are in a lane of the road.

To do this, the system will look at lanes of the road and determine which locations in those lanes may be goal locations where the second vehicle merge into the flow of traffic. This process begins at 403 in which the system generates an object ray for the second vehicle. The object ray represents a candidate path of travel for the second vehicle away from the off-road parking location. The starting point of the ray may be a point representing the position of the second vehicle (for example, the vehicle's center point, or a point on or near the front of the vehicle). The ray's orientation may be set to either (a) the direction of the second vehicle's velocity, if the system detected actual movement of the second vehicle, or (b) the second vehicle's heading, as determined by the perception system based on the second vehicle's pose.

If the object ray does not reach a lane of the road (404: NO), the process of this disclosure may stop, as this process will not infer that the second vehicle intends to leave the parking area. However, if the object ray that reaches any of the road's lanes (404: YES), then at 405 the system will determine a candidate goal location within each lane that the object ray reaches. The system may do this by calculating intersections between the object ray and each such lane. The intersection may be a location at which the object ray meets the centerline of the lane, a location at which the object ray comes within a threshold distance from the centerline, a location where the object ray crosses an edge of the lane, a threshold distance from such an edge, or another location in the lane. The system may use each intersection to select a candidate goal location. The candidate goal location may be the point of intersection, or a specified distance advancing away from the intersection in a direction of travel the lane.

Figure 6A:
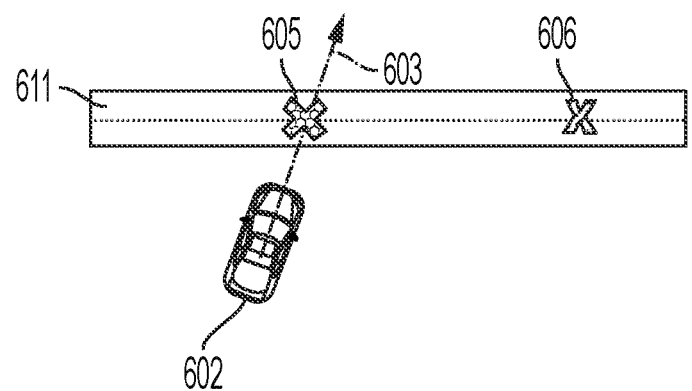
FIGS. 6A and 6B illustrate how a system may generate an object ray for a vehicle in an off-road parking area, determine an intersection between the object ray and a lane of the road, and use the intersection to generate candidate goal locations in the road for the vehicle.
Figure 6B:
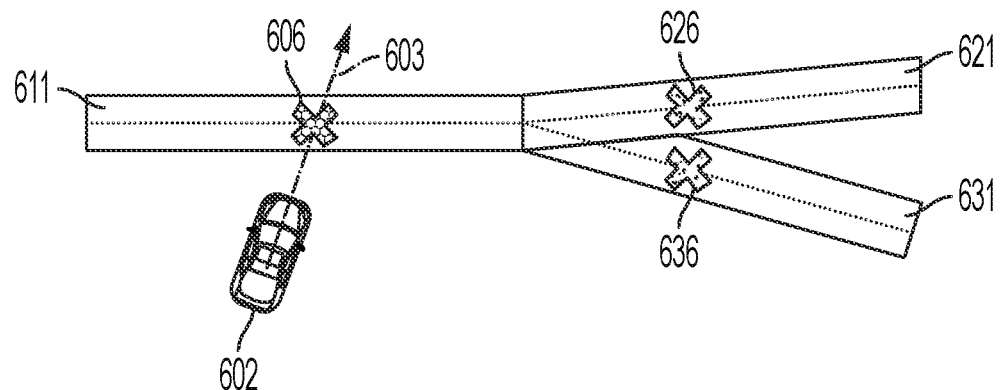

This is illustrated by way of example in FIG. 6A, in which the object ray 603 extends from the second vehicle 602 in the second vehicle's direction of travel, and the object ray 603 crosses a centerline of lane 611 at intersection 605. The direction of travel of lane 611 is left to right. In this example, the candidate goal location 606 is a specified distance on the centerline away from the intersection 605 in the direction of travel. FIG. 6B illustrates how the system may identify candidate goal locations if the lane 611 that splits into first and second successor lanes 621, 631 before between the intersection 606 and the specified distance from the intersection. In this case, the system will identify a first candidate position 626 along a first centerline of the first successor 621, in which the first candidate position 626 is the specified distance from the intersection 606 in the first successor lane 621 along the first centerline in the direction of travel. The system also will identify a second candidate position 636 along a second centerline of the second successor lane 631, in which the second candidate position 636 is the specified distance from the intersection 606 in the direction of travel. The system will then use the first candidate position 626 and the second candidate position 636 as candidate goal locations.

Figure 7:
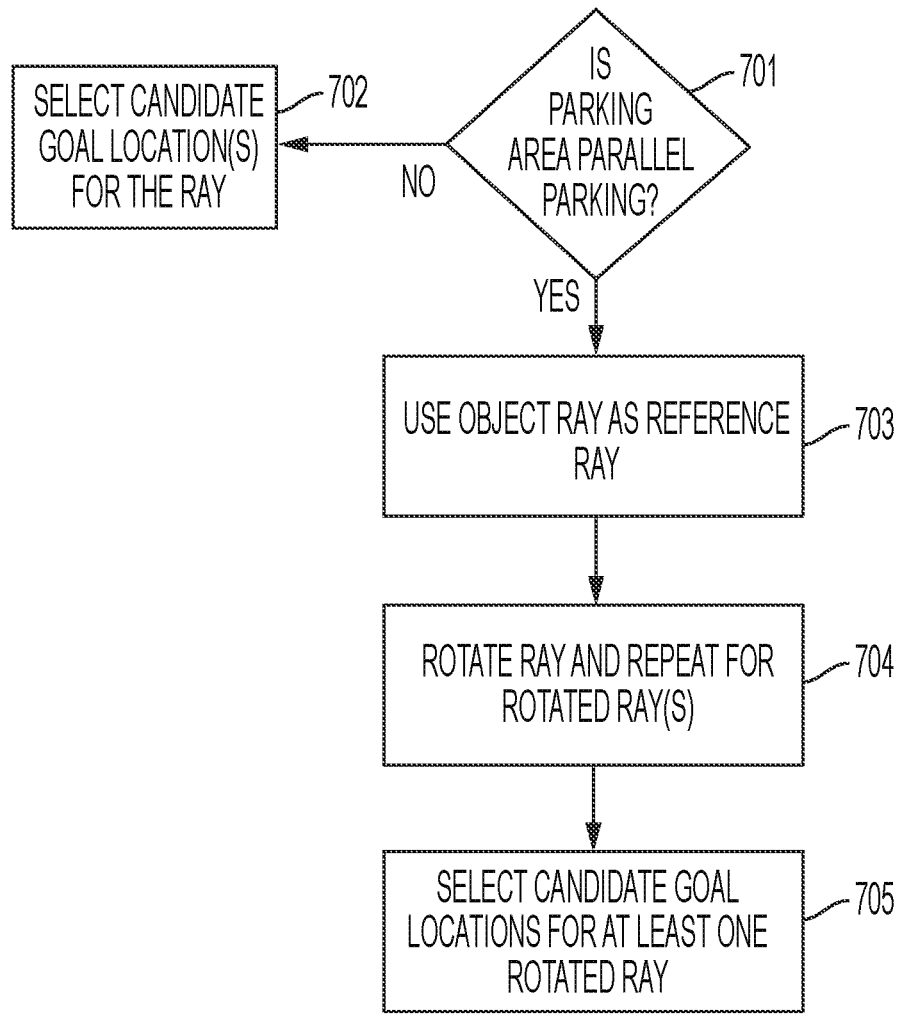
FIG. 7 illustrates an example process that may apply when a vehicle is in a parking area that is a parallel parking location.

Note that in situation where a vehicle is parallel parked in an off-road area that is a parallel parking location, the object ray generated as shown above may not always intersect with the road. However, the vehicle may still exhibit intent to enter the road. FIG. 7 illustrates how the system may account for this. If the second vehicle's off-road parking area is not a parallel parking location (701: NO), then at 702 the system selects candidate goal locations using an object ray generated as described above. However, if the second vehicle's off-road parking area is a parallel parking location (701: YES), then at 703 the system may consider the object ray generated as above to be a reference ray. The system will then generate at least first and second additional object rays at 704, in which each of the additional object rays equals the reference ray rotated about its starting point by an angle. For example, the first additional ray may be a ray that is rotated to the right by a specified angle (such as 20, 30, 40, 45, 50, or another number of degrees), which the second additional ray may be a ray that is rotated to the left by the same specified angle or by a different specified angle. The system may then select candidate goal locations for at least one of the rotated rays at 705. If any of the rotated rays (or even the reference ray) reaches a lane of the road, at 705 the system may select a candidate goal location for each ray that reaches a lane of the road.

Returning to FIG. 4, once the system has identified candidate goal locations at 405 the system will apply one or more rules to filter out (i.e., remove or exclude) some of the candidate goal locations so that the remaining goal locations are likely goal locations. As an example filter rule, if two or more goal locations are similar (i.e., in the same location or within a threshold distance from each other in the same lane, and also resulting from object rays having the same or substantially the same heading), then at 426 the system may exclude one or more of the similar goal locations so that only one such goal location is retained. In addition, at 436 the system may exclude any goal locations that are unreachable from the second vehicle's parking location, such as locations that are blocked by physical barriers, or by traffic controls, or locations that would require the second vehicle to execute a movement that would violate a traffic law that applies to the lane, or that would violate a comfort restriction rule (such as a requirement that the vehicle not exceed a certain level of acceleration or turning radius when entering the lane).

Once the system has filtered out candidate goal locations at 406 to yield only likely goal locations, if no candidate goal locations remain that will intersect any lane of the road (407: NO), then the process may stop at 415 and the system may not be required to forecast a trajectory for the second vehicle or give further consideration to motion of the second vehicle. However, if any remaining candidate goal locations will intersect a lane of the road (407: YES), then at 408 the system will infer that the second vehicle intends to leave the off-road parking area.

In response to this inference of intent that the second vehicle intends to leave the off-road parking area, at 409 a forecasting system associated with the first vehicle will use one or more of the likely goal locations to forecast a trajectory of the second vehicle. Any trajectory forecasting methods, including but not limited to those known in the art and described elsewhere in this document, may be used in this step. If the first vehicle is an AV, at 410 a motion planning system associated with the first vehicle may then plan an action of the first vehicle that is responsive to the forecasted trajectory of the second vehicle. Any motion planning methods, including but not limited to those known in the art and described elsewhere in this document, may be used in this step.

Figure 8:
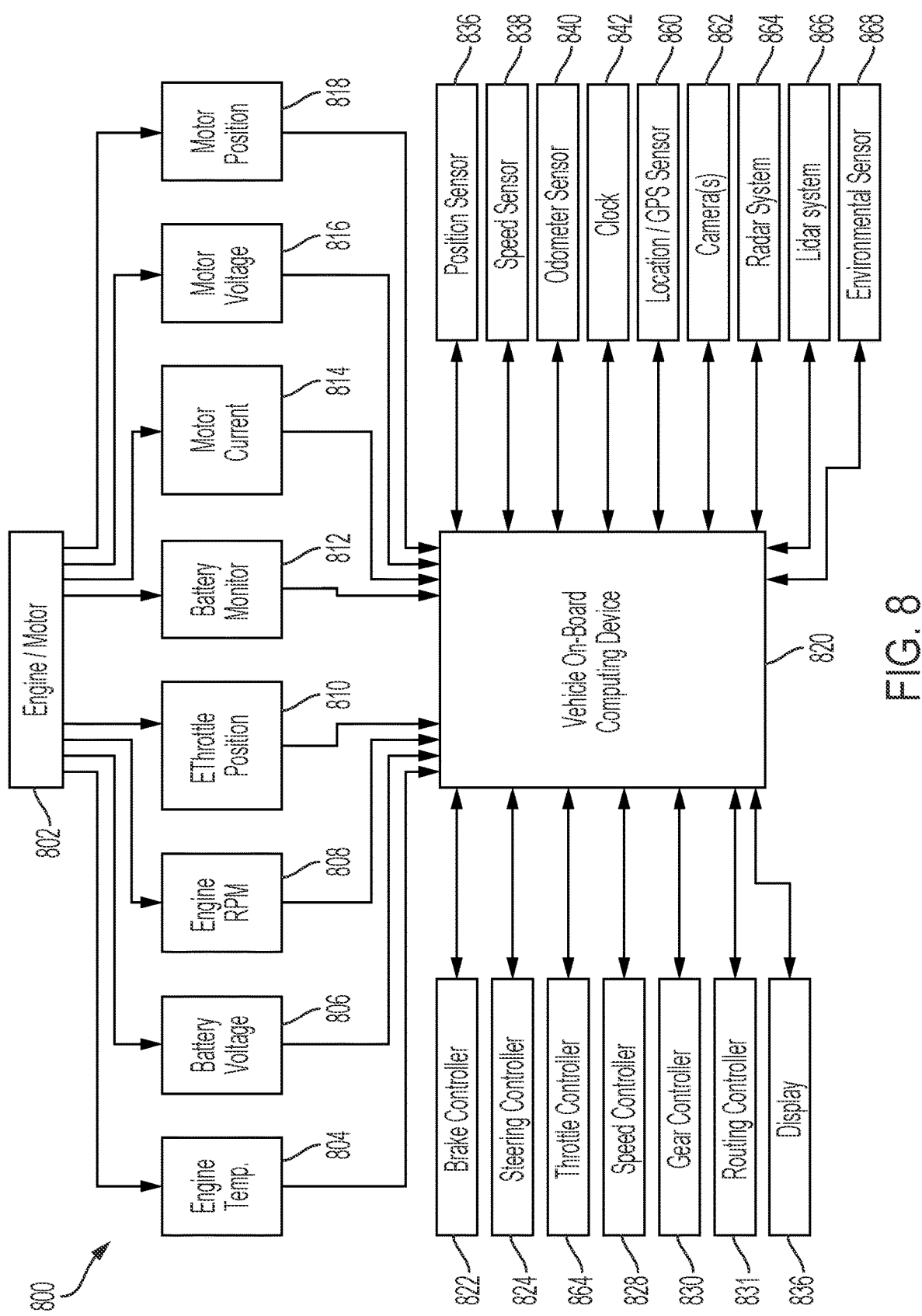
FIG. 8 illustrates an example architecture for a vehicle, in accordance with aspects of the disclosure.

FIG. 8 illustrates an example system architecture 800 for a vehicle, in accordance with aspects of the disclosure. Vehicles 102 and/or 103 of FIG. 1 can have the same or similar system architecture as that shown in FIG. 7. Thus, the following discussion of system architecture 800 is sufficient for understanding vehicle(s) 102, 103 of FIG. 1. However, other types of vehicles are considered within the scope of the technology described in this document and may contain more or less elements as described in association with FIG. 8. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 8, system architecture 800 for a vehicle includes an engine or motor 802 and various sensors for measuring various parameters of the vehicle. In gas-powered or hybrid vehicles having a fuel-powered engine, the sensors may include, for example, an engine temperature sensor 804, a battery voltage sensor 806, an engine revolutions per minute ("RPM") sensor 808, and a throttle position sensor 810. If the vehicle is an electric or hybrid vehicle, then the vehicle may have an electric motor, and accordingly includes sensors such as a battery monitoring system 812 (to measure current, voltage and/or temperature of the battery), motor current 814 and voltage 816 sensors, and motor position sensors 818 such as resolvers and encoders.

Operational parameter sensors that are common to both types of vehicles include, for example: a position sensor 836 such as an accelerometer, gyroscope and/or inertial measurement unit; a speed sensor 838; and an odometer sensor 840. The vehicle also may have a clock 842 that the system uses to determine vehicle time during operation. The clock 842 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 860 (such as a Global Positioning System ("GPS") device); object detection sensors such as one or more cameras 862; a LIDAR system 864; and/or a radar and/or a sonar system 766. The sensors also may include environmental sensors 868 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 820. The on-board computing device 820 may be implemented using computer system such as that illustrated in FIG. 9. The vehicle on-board computing device 820 analyzes the data captured by the sensors and optionally controls operations of the vehicle based on results of the analysis. For example, the vehicle on-board computing device 820 may control: braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers. Auxiliary device controller 854 may be configured to control one or more auxiliary devices, such as testing systems, auxiliary sensors, mobile devices transported by the vehicle, etc.

Geographic location information may be communicated from the location sensor 860 to the on-board computing device 820, which may then access a map of the environment that corresponds to the location information to determine known fixed features of the environment such as streets, buildings, stop signs and/or stop/go signals. Captured images from the cameras 862 and/or object detection information captured from sensors such as lidar system 864 is communicated from those sensors) to the on-board computing device 820. The object detection information and/or captured images are processed by the on-board computing device 820 to detect objects in proximity to the vehicle. Any known or to be known technique for making an object detection based on sensor data and/or captured images can be used in the embodiments disclosed in this document.

LIDAR information is communicated from LIDAR system 864 to the on-board computing device 820. Additionally, captured images are communicated from the camera(s) 862 to the vehicle on-board computing device 820. The lidar information and/or captured images are processed by the vehicle on-board computing device 820 to detect objects in proximity to the vehicle. The manner in which the object detections are made by the vehicle on-board computing device 820 includes such capabilities detailed in this disclosure.

In addition, the system architecture 800 may include an onboard display device 836 that may generate and output an interface on which sensor data, vehicle status information, or outputs generated by the processes described in this document are displayed to an occupant of the vehicle. The display device may include, or a separate device may be, an audio speaker that presents such information in audio format.

The on-board computing device 820 may include and/or may be in communication with a routing controller 831 that generates a navigation route from a start position to a destination position for an autonomous vehicle. The routing controller 831 may access a map data store to identify possible routes and road segments that a vehicle can travel on to get from the start position to the destination position. The routing controller 831 may score the possible routes and identify a preferred route to reach the destination. For example, the routing controller 831 may generate a navigation route that minimizes Euclidean distance traveled or other cost function during the route, and may further access the traffic information and/or estimates that can affect an amount of time it will take to travel on a particular route. Depending on implementation, the routing controller 831 may generate one or more routes using various routing methods, such as Dijkstra's algorithm, Bellman-Ford algorithm, or other algorithms. The routing controller 831 may also use the traffic information to generate a navigation route that reflects expected conditions of the route (e.g., current day of the week or current time of day, etc.), such that a route generated for travel during rush-hour may differ from a route generated for travel late at night. The routing controller 831 may also generate more than one navigation route to a destination and send more than one of these navigation routes to a user for selection by the user from among various possible routes.

In various embodiments, the on-board computing device 820 may determine perception information of the surrounding environment of the AV 102. Based on the sensor data provided by one or more sensors and location information that is obtained, the on-board computing device 820 may determine perception information of the surrounding environment of the AV 102. The perception information may represent what an ordinary driver would perceive in the surrounding environment of a vehicle. The perception data may include information relating to one or more objects in the environment of the AV 102. For example, the on-board computing device 820 may process sensor data (e.g., lidar or RADAR data, camera images, etc.) in order to identify objects and/or features in the environment of AV 102. The objects may include traffic signals, roadway boundaries, other vehicles, pedestrians, and/or obstacles, etc. The on-board computing device 820 may use any now or hereafter known object recognition algorithms, video tracking algorithms, and computer vision algorithms (e.g., track objects frame-to-frame iteratively over a number of time periods) to determine the perception.

In some embodiments, the on-board computing device 820 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The on-board computing device 820 may perform one or more prediction and/or forecasting operations. For example, the on-board computing device 820 may predict future locations, trajectories, and/or actions of one or more objects. For example, the on-board computing device 820 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102, the surrounding environment, and/or their relationship(s). For example, if an object is a vehicle and the current driving environment includes an intersection, the on-board computing device 820 may predict whether the object will likely move straight forward or make a turn. If the perception data indicates that the intersection has no traffic light, the on-board computing device 820 may also predict whether the vehicle may have to fully stop prior to entering the intersection.

In various embodiments, the on-board computing device 820 may determine a motion plan for the autonomous vehicle. For example, the on-board computing device 820 may determine a motion plan for the autonomous vehicle based on the perception data and/or the prediction data. Specifically, given predictions about the future locations of proximate objects and other perception data, the on-board computing device 820 can determine a motion plan for the AV 102 that best navigates the autonomous vehicle relative to the objects at their future locations.

In some embodiments, the on-board computing device 820 may receive predictions and make a decision regarding how to handle objects and/or actors in the environment of the AV 102. For example, for a particular actor (e.g., a vehicle with a given speed, direction, turning angle, etc.), the on-board computing device 820 decides whether to overtake, yield, stop, and/or pass based on, for example, traffic conditions, map data, state of the autonomous vehicle, etc.

Furthermore, the on-board computing device 820 also plans a path for the AV 102 to travel on a given route, as well as driving parameters (e.g., distance, speed, and/or turning angle). That is, for a given object, the on-board computing device 820 decides what to do with the object and determines how to do it. For example, for a given object, the on-board computing device 820 may decide to pass the object and may determine whether to pass on the left side or right side of the object (including motion parameters such as speed). The on-board computing device 820 may also assess the risk of a collision between a detected object and the AV 102. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 820 may execute one or more control instructions to perform a cautious maneuver (e.g., mildly slow down, accelerate, change lane, or swerve). In contrast, if the collision cannot be avoided, then the on-board computing device 820 may execute one or more control instructions for execution of an emergency maneuver (e.g., brake and/or change direction of travel).

As discussed above, planning and control data regarding the movement of the autonomous vehicle is generated for execution. The on-board computing device 820 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 9:
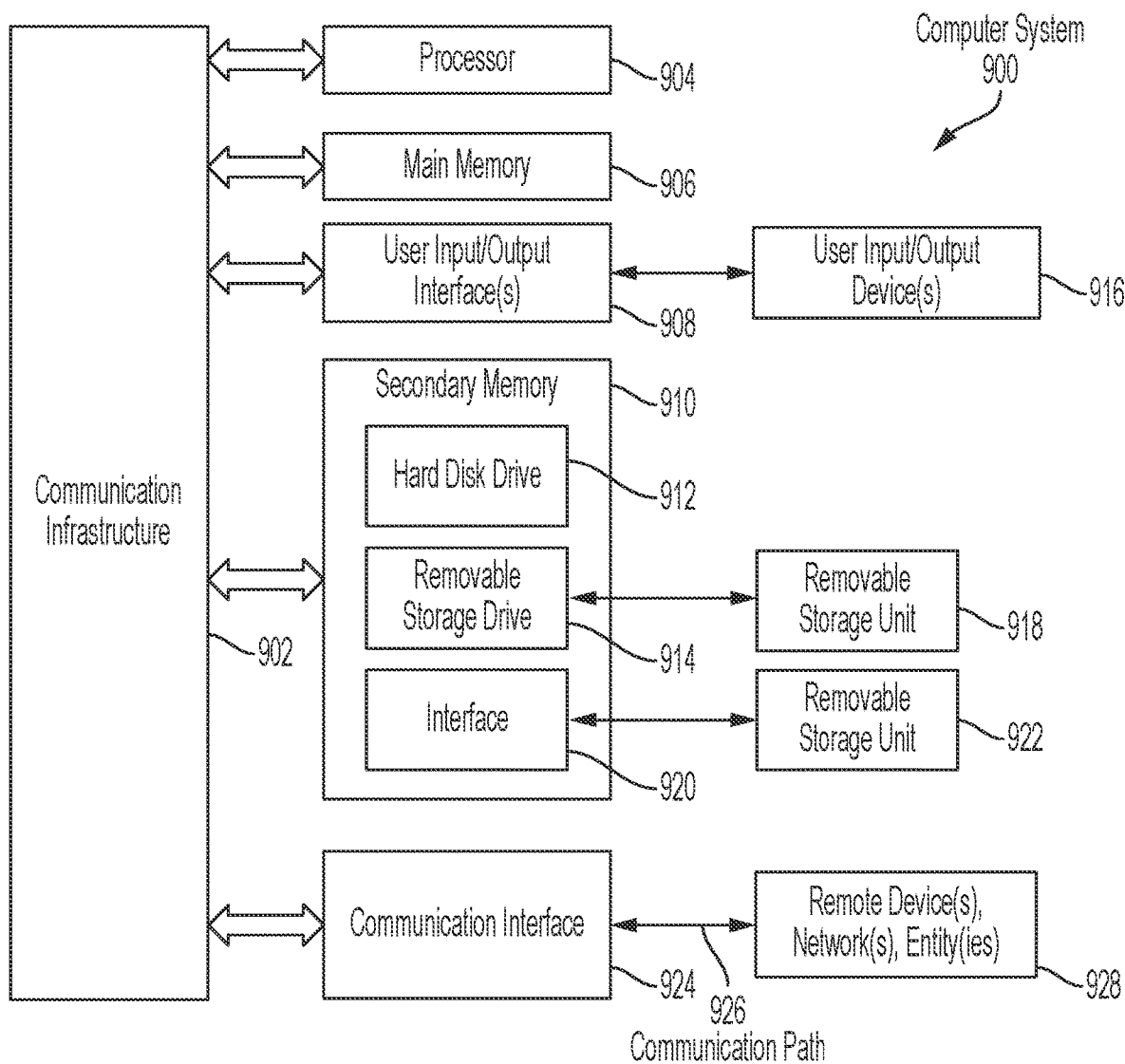
FIG. 9 illustrates elements of a computer system useful for implementing various embodiments.

Various embodiments can be implemented, for example, using one or more computer systems, such as computer system 900 shown in FIG. 9. Computer system 900 can be any computer capable of performing the functions described in this document.

Computer system 900 includes one or more processors (also called central processing units, or CPUs), such as a processor 904. Processor 904 is connected to a communication infrastructure or bus 902. Optionally, one or more of the processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 916, such as monitors, keyboards, pointing devices, etc., that communicate with communication infrastructure 902 through user input/output interface(s) 908.

Computer system 900 also includes a main or primary memory 906, such as random access memory (RAM). Main memory 906 may include one or more levels of cache. Main memory 906 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 914 reads from and/or writes to removable storage unit 918 in a well-known manner.

According to an example embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of local area networks (LANs), wide area networks (WANs), the Internet, etc. Control logic and/or data may be transmitted to and from computer system 900 via communication path 926.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 900, main memory 906, secondary memory 910, and removable storage units 918 and 922, as well as tangible articles of manufacture embodying any combination of the foregoing. Such control logic, when executed by one or more data processing devices (such as computer system 900), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described in this document.

Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The term "wireless communication" refers to communication between two devices in which at least a portion of the communication path includes a signal that is transmitted wirelessly, but it does not necessarily require that the entire communication path be wireless.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor.

Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LIDAR system data, and/or other data.

As used in this document, the terms "infer" and "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventors, and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in in this document.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

The invention claimed is:

1. A method of forecasting a trajectory of a vehicle, the method comprising:
   detecting, by a first vehicle, that a second vehicle is at least partially positioned in an off-road parking location that is proximate to a road;
   assessing, by the first vehicle, whether the second vehicle exhibits intent to leave the off-road parking location and enter the road by:

forecasting a plurality of candidate goal locations for the second vehicle,
filtering the plurality of candidate goal locations to yield a subset of likely goal locations, and
in response to at least one of the candidate goal locations intersecting with a lane of the road, determining that the second vehicle exhibits intent to leave the off-road parking location;
using the subset of likely goal locations to forecast a trajectory of the second vehicle; and
causing the vehicle to move based on the trajectory of the second vehicle,
wherein forecasting the plurality of candidate goal locations for the second vehicle comprises:
generating an object ray that represents a candidate path of travel for the second vehicle away from the off-road parking location, and
using a plurality of intersections, each of which is a location at which the object ray is in a lane of the road, to select the plurality of candidate goal locations, wherein using the plurality of intersections to select the plurality of candidate goal locations further comprises, for each lane in which the object ray is in the lane:
identifying any intersection at which the object ray meets a centerline of the lane, and
using either the intersection, or a specified distance from the intersection in a direction of travel the lane, as the candidate goal location.

2. The method of claim 1 further comprising:
planning an action of the first vehicle that is responsive to the forecasted trajectory of the second vehicle.

3. The method of claim 1, wherein detecting that the second vehicle is at least partially positioned in the off-road parking location comprises:
measuring an area of overlap between a polygon representing a position of the second vehicle and a polygon associated with one or more lanes of the road that are proximate to the second vehicle; and
detecting that the second vehicle is at least partially positioned in the off-road parking location in response to the area of overlap being less than a threshold occupancy level.

4. The method of claim 1, wherein:
assessing whether the second vehicle exhibits intent to leave the off-road parking location and enter the road further comprises identifying a motion action by either:
detecting that the second vehicle is taking or took the motion action, or
using a classifier to classify the second vehicle as not parked; and
determining that the second vehicle exhibits intent to leave the off-road parking location is also in response to identifying the motion action.

5. The method of claim 1, wherein generating the object ray comprises generating a ray that:
starts at the off-road parking location; and
is oriented in a direction of a heading or a velocity of the second vehicle.

6. The method of claim 1 wherein, for any lane that splits into first and second successor lanes between the intersection and the specified distance from the intersection, selecting the plurality of candidate goal locations further comprises, for that lane:
identifying a first candidate position along a first centerline of the first successor lane, wherein the first candidate position is a specified distance from the intersection along the first centerline in the direction of travel of the lane;
identifying a second candidate position along a second centerline of the second successor lane, wherein the second candidate position is a specified distance from the intersection along the second centerline the direction of travel of the lane; and
using the first candidate position and the second candidate position as candidate goal locations.

7. The method of claim 1, wherein:
generating the object ray comprises, in response to determining that the off-road parking location is a parallel parking location:
generating a reference ray that starts at the off-road parking location and is oriented in a direction of a heading or a velocity of the second vehicle,
generating a first object ray that is oriented in a direction that is rotated to the left of the reference ray, and
generating a second object ray that is oriented in a direction that is rotated to the right of the reference ray; and
using the plurality of intersections to select the plurality of candidate goal locations comprises using an intersection of the first object ray, the second object ray, or both with one or more lanes of the road.

8. The method of claim 1, wherein filtering the plurality of candidate goal locations to yield a subset of likely goal locations comprises one or more of the following:
excluding one or more of the candidate goal locations having a position and a heading that are substantially similar to a position and a heading of at least one other of the candidate goal locations; or
excluding any of the candidate goal locations that are not physically reachable by the second vehicle.

9. A system for forecasting a trajectory of a vehicle, the system comprising:
a processor; and
a memory device containing programming instructions that are configured to cause the processor to:
receive, at a first vehicle that is on a road, data indicating that a second vehicle is at least partially positioned in an off-road parking location that is proximate to the road,
assess whether the second vehicle exhibits intent to leave the off-road parking location and enter the road by:
forecasting a plurality of candidate goal locations for the second vehicle;
filtering the plurality of candidate goal locations to yield a subset of likely goal locations; and
in response to at least one of the candidate goal locations intersecting with a lane of the road, determining that the second vehicle exhibits intent to leave the off-road parking location,
forecasting a trajectory of the second vehicle using the subset of likely goal locations, and
provide instructions to cause the vehicle to move based on the trajectory of the second vehicle,
wherein the instructions to forecast the plurality of candidate goal locations for the second vehicle comprise instructions to:
generate an object ray that starts at the off-road parking location, that is oriented in a direction of a heading or a velocity of the second vehicle, and that represents a candidate path of travel for the second vehicle away from the off-road parking location; and use a plurality of intersections, each of which is a location at which the object ray is in a lane of the road, to select the plurality of candidate goal locations, wherein the instructions to use the plurality of intersections to select the plurality of candidate goal locations comprise instructions to, for each lane in which the object ray is in the lane:

identify any intersection at which the object ray meets a centerline of the lane; and use either the intersection, or a specified distance from the intersection in a direction of travel the lane, as the candidate goal location.

10. The system of claim 9, further comprising one or more sensors that are on-board the first vehicle and that are configured to receive the data.

11. The system of claim 9, wherein the programming instructions are further configured to cause the processor to:
plan an action of the first vehicle that is responsive to the forecasted trajectory of the second vehicle.

12. The system of claim 9 wherein the programming instructions are further configured to cause the processor to:
measure an area of overlap between a polygon representing a position of the second vehicle and a polygon associated with one or more lanes of the road that are proximate to the second vehicle; and
generate the data indicating that the second vehicle is at least partially positioned in the off-road parking location in response to the area of overlap being less than a threshold occupancy level.

13. The system of claim 9, wherein:
the instructions to assess whether the second vehicle exhibits intent to leave the off-road parking location and enter the road comprise instructions to identify a motion action in response to either:
detecting that the second vehicle is taking or took the motion action, or
a classifier classifying the second vehicle as not parked; and
the instructions to determine that the second vehicle exhibits intent to leave the off-road parking location is also in response to identifying the motion action.

14. The system of claim 9, wherein the instructions to use the plurality of intersections to select the plurality of candidate goal locations further comprise instructions to, for any lane that splits into first and second successor lanes between the intersection and the specified distance from the intersection:
identify a first candidate position along a first centerline of the first successor lane, wherein the first candidate position is a specified distance from the intersection along the first centerline in the direction of travel of the lane;
identify a second candidate position along a second centerline of the second successor lane, wherein the second candidate position is a specified distance from the intersection along the second centerline the direction of travel of the lane; and
use the first candidate position and the second candidate position as candidate goal locations.

15. The system of claim 9, wherein:
the instructions to generate the object ray comprise instructions to, when the off-road parking location is a parallel parking location:
generate a reference ray that starts at the off-road parking location and is oriented in a direction of a heading or a velocity of the second vehicle,
generate a first object ray that is oriented in a direction that is rotated to the left of the reference ray, and
generate a second object ray that is oriented in a direction that is rotated to the right of the reference ray; and
the instructions to use the plurality of intersections to select the plurality of candidate goal locations comprise instructions to use an intersection of the first object ray, the second object ray, or both with one or more lanes of the road.

16. A non-transitory computer-readable medium that stores instructions that are configured to, when executed by a processor, cause the processor to perform operations comprising:
receiving, at a first vehicle that is on a road, data indicating that a second vehicle is at least partially positioned in an off-road parking location that is proximate to the road;
assessing whether the second vehicle exhibits intent to leave the off-road parking location and enter the road by:
forecasting a plurality of candidate goal locations for the second vehicle,
filtering the plurality of candidate goal locations to yield a subset of likely goal locations, and
in response to at least one of the candidate goal locations intersecting with a lane of the road, determining that the second vehicle exhibits intent to leave the off-road parking location;
using the subset of likely goal locations to forecast a trajectory of the second vehicle; and
causing the vehicle to move based on the trajectory of the second vehicle,
wherein forecasting the plurality of candidate goal locations for the second vehicle comprises:
generating an object ray that represents a candidate path of travel for the second vehicle away from the off-road parking location, and
using a plurality of intersections, each of which is a location at which the object ray is in a lane of the road, to select the plurality of candidate goal locations, wherein using the plurality of intersections to select the plurality of candidate goal locations further comprises, for each lane in which the object ray is in the lane:
identifying any intersection at which the object ray meets a centerline of the lane, and
using either the intersection, or a specified distance from the intersection in a direction of travel the lane, as the candidate goal location.

17. The non-transitory computer-readable medium of claim 16, wherein the instructions for detecting that the second vehicle is at least partially positioned in the off-road parking location further cause the processor to perform operations comprising:
measuring an area of overlap between a polygon representing a position of the second vehicle and a polygon associated with one or more lanes of the road that are proximate to the second vehicle; and
detecting that the second vehicle is at least partially positioned in the off-road parking location in response to the area of overlap being less than a threshold occupancy level.

18. The non-transitory computer-readable medium of claim 16, wherein:
the instructions for assessing whether the second vehicle exhibits intent to leave the off-road parking location and enter the road further cause the processor to perform operations comprising identifying a motion action by either:
  detecting that the second vehicle is taking or took the motion action, or
  using a classifier to classify the second vehicle as not parked; and
the instructions further cause the process to perform operation comprising determining that the second vehicle exhibits intent to leave the off-road parking location is also in response to identifying the motion action.

19. The non-transitory computer-readable medium of claim 16, wherein the instructions for generating the object ray further cause the processor to perform operations comprising generating a ray that:
  starts at the off-road parking location; and
  is oriented in a direction of a heading or a velocity of the second vehicle.

20. The non-transitory computer-readable medium of claim 16, wherein the instructions for filtering the plurality of candidate goal locations to yield a subset of likely goal locations further cause the processor to perform operations comprising one or more of the following:
  excluding one or more of the candidate goal locations having a position and a heading that are substantially similar to a position and a heading of at least one other of the candidate goal locations; or
  excluding any of the candidate goal locations that are not physically reachable by the second vehicle.

* * * * *